(12) United States Patent
Cho et al.

(10) Patent No.: US 9,676,910 B2
(45) Date of Patent: Jun. 13, 2017

(54) COMPOSITION FOR PREPARING POLYIMIDE, POLYMER, ARTICLE INCLUDING POLYMER, AND DISPLAY DEVICE INCLUDING ARTICLE

(71) Applicant: SAMSUNG ELECTRONICS CO., LTD., Suwon-si, Gyeonggi-do (KR)

(72) Inventors: Chung Kun Cho, Suwon-si (KR); Fedosya Kalinina, Hwaseong-si (KR); Mikhail Kovalev, Suwon-si (KR); Woo-Jin Bae, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 36 days.

(21) Appl. No.: 14/503,695

(22) Filed: Oct. 1, 2014

(65) Prior Publication Data

US 2015/0307693 A1    Oct. 29, 2015

(30) Foreign Application Priority Data

Apr. 25, 2014  (KR) .................. 10-2014-0050304

(51) Int. Cl.
*C08G 73/10* (2006.01)
*C09D 179/06* (2006.01)
*C08G 83/00* (2006.01)
*C09D 179/08* (2006.01)

(52) U.S. Cl.
CPC ....... *C08G 83/001* (2013.01); *C08G 73/1007* (2013.01); *C08G 73/1039* (2013.01); *C08G 73/1042* (2013.01); *C08G 73/1067* (2013.01); *C09D 179/08* (2013.01)

(58) Field of Classification Search
CPC ................................ C08K 9/06; C08G 83/001
See application file for complete search history.

(56) References Cited

U.S. PATENT DOCUMENTS

| 7,241,491 | B2* | 7/2007 | Fukuda | ................... | B32B 15/08 |
| | | | | | 428/323 |
| 2009/0252957 | A1* | 10/2009 | Kasumi | ................... | B32B 15/08 |
| | | | | | 428/458 |
| 2010/0132989 | A1 | 6/2010 | Fujihara et al. | | |
| 2011/0061914 | A1 | 3/2011 | Sekito | | |
| 2011/0091732 | A1* | 4/2011 | Lu | ........................... | B32B 15/08 |
| | | | | | 428/458 |

FOREIGN PATENT DOCUMENTS

| JP | 2001-163974 A | 6/2001 |
| JP | 2012-140561 A | 7/2012 |

\* cited by examiner

*Primary Examiner* — Vickey Nerangis
(74) *Attorney, Agent, or Firm* — Cantor Colburn LLP

(57) ABSTRACT

A composition for preparing a polyimide including an oligomer including at least two termini, wherein the oligomer is selected from a polyimide, a polyamic acid, a poly(imide-amic acid), and a combination thereof, and wherein at least two of the at least two termini of the oligomer include a dicarboxylic acid group; and an inorganic particle having a surface, wherein the surface comprises two or more amino groups.

18 Claims, 10 Drawing Sheets

COMPOSITION FOR PREPARING POLYIMIDE, POLYMER, ARTICLE INCLUDING POLYMER, AND DISPLAY DEVICE INCLUDING ARTICLE

CROSS-REFERENCE TO RELATED APPLICATION

This application claims priority to Korean Patent Application No. 10-2014-0050304, filed on Apr. 25, 2014, and all the benefits accruing therefrom under 35 U.S.C. §119, the content of which is incorporated herein in its entirety by reference.

BACKGROUND

1. Field

This disclosure relates to a composition for preparing polyimide, a polymer prepared from the composition, an article including the polymer, and a display device including the article.

2. Description of the Related Art

A colorless transparent material has been researched for diverse applications such as an optical lens, a functional optical film, and a disk substrate. But as information devices are being further miniaturized and display devices providing higher resolution are developed, more functions and greater performance are desired from the material.

Therefore, there remains a need in a colorless transparent material having excellent transparency, heat resistance, mechanical strength, and flexibility to ensure high resolution.

SUMMARY

An embodiment provides a composition for preparing a polyimide having improved storage stability.

Another embodiment provides a polymer prepared from the composition.

Yet another embodiment provides an article including the polymer.

Still yet another embodiment provides a display device including the article.

According to an embodiment, provided is a composition for preparing a polyimide including:

an oligomer comprising at least two termini, wherein the oligomer is selected from a polyimide, a polyamic acid, a poly(imide-amic acid), or a combination thereof, and at least two of the at least two termini of the oligomer include a dicarboxylic acid group; and an inorganic particle comprising a surface, wherein the surface includes two or more amino groups.

The inorganic particle is selected from an oxide or hydroxide of at least one selected from Ti, Si, Al, Zr, Sn, B, Ce, and a combination thereof.

The two or more amino groups are derived from a compound having an amino functional group.

The compound having an amino functional group is represented by Chemical Formula 1:

Chemical Formula 1

In Chemical Formula 1, $R^a$ may be a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted arylene, or a substituted or unsubstituted aralkylene, $R^b$ may be hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, wherein the substituent may be an acryloxy, glycidoxy, or isocyanato, $R^b$ may be hydrogen, C1 to C20 alkyl, a C2 to C20 alkenyl, a C2 to C20 alkynyl, a C3 to C20 cycloalkyl, or a C6 to C18 aryl, n is an integer ranging from 1 to 3.

The compound of Chemical Formula 1 may be 3-aminopropyl-trimethoxy silane, 3-aminopropyl triethoxy silane, or aminophenyl trimethoxy silane.

The inorganic particle may be $SiO_2$, or $TiO_2$.

The surface of the inorganic particle may further include groups derived from an organic silane compound represented by Chemical Formula 2:

Chemical Formula 2

In Chemical Formula 2, $R^b$, $R^c$, and n are the same as defined in Chemical Formula 1.

The compound of Chemical Formula 2 may be at least one selected from methacryloxypropyl trimethoxy silane, (3-glycidoxypropyl) triethoxy silane, 3-isocyanatopropyl triethoxy silane, dimethyl diethoxy silane, phenyl triethoxy silane, and a combination thereof.

The oligomer in the composition may be represented by Chemical Formula 3:

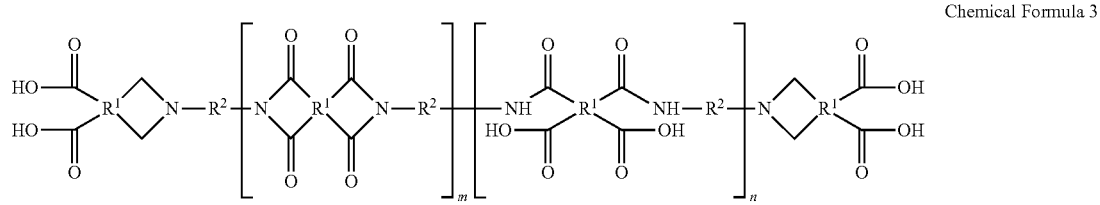

Chemical Formula 3

In Chemical Formula 3, $R^1$ is the same or different in each structural unit, and each is independently represented by any one of Chemical Formula 4-1 to Chemical Formula 4-3:

Chemical Formula 4-1

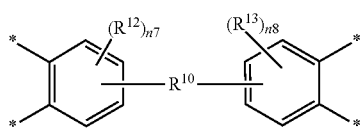

In Chemical Formula 4-1, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula $-OR^{205}$, wherein $R^{205}$ is a C1 to C10 aliphatic organic group, or a silyl group of formula $-SiR^{209}R^{210}R^{211}$, wherein $R^{209}$, $R^{210}$, and $R^{211}$ are the same or different and each are independently a hydrogen, or a C1 to C10 aliphatic organic group, and n7 and n8 are the same or different and each are independently an integer ranging from 0 to 3.

Chemical Formula 4-2

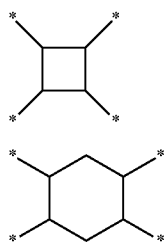

Chemical Formula 4-3

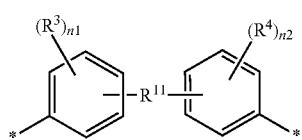

In Chemical Formula 3, $R^2$ is the same or different in each structural unit, and each is independently represented by Chemical Formula 5, Chemical Formula 6, or Chemical Formula 7:

Chemical Formula 5

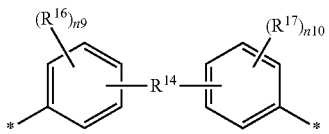

In Chemical Formula 5, $R^{11}$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group, $R^3$ and $R^4$ are the same or different and each are independently a halogen, a hydroxyl group, a substituted or unsubstituted C1 to C10 aliphatic organic group, a substituted or unsubstituted C6 to C20 aromatic organic group, an alkoxy group of formula $-OR^{200}$, wherein $R^{200}$ is a C1 to C10 aliphatic organic group, or a silyl group of formula $-SiR^{201}R^{202}R^{203}$, wherein $R^{201}$, $R^{202}$, and $R^{203}$ are the same or different and each are independently a hydrogen, or a C1 to C10 aliphatic organic group, and n1 and n2 are the same or different and each are independently an integer ranging from 0 to 4.

Chemical Formula 6

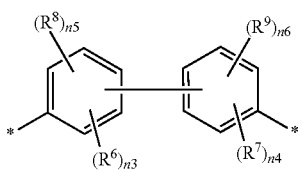

In Chemical Formula 6, $R^6$ and $R^7$ are the same or different and each are independently an electron withdrawing group, $R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula $-OR^{204}$, wherein $R^{204}$ is a C1 to C10 aliphatic organic group, or a silyl group of formula $-SiR^{205}R^{206}R^{207}$, wherein $R^{205}$, $R^{206}$, and $R^{207}$ are the same or different, and each are independently a hydrogen, a C1 to C10 aliphatic organic group, n3 is an integer ranging from 1 to 4,
n5 is an integer ranging from 0 to 3,
provided that n3+n5 is an integer ranging from 1 to 4,
n4 is an integer ranging from 1 to 4, and
n6 is an integer ranging from 0 to 3,
provided that n4+n6 is an integer ranging from 1 to 4.

Chemical Formula 7

In Chemical Formula 7, $R^{14}$ is O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more moieties linked through a single bond or through a functional group selected from a fluorenylene group, O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, and C(=O)NH, $R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula $-OR^{212}$, wherein $R^{212}$ is a C1 to C10 aliphatic organic group, or a silyl group of formula $-SiR^{213}R^{214}R^{215}$, wherein $R^{213}$, $R^{214}$, and $R^{215}$ are the same or different, and each are independently a hydrogen or a C1 to C10 aliphatic organic group, and n9 and n10 are each independently an integer ranging from 0 to 4.

In Chemical Formula 3, each m and n indicates the mole numbers of each structural unit, and is an integer of equal to or greater than 0, provided that m+n is equal to or greater than 1.

The Chemical Formula 4-1 may be represented by Chemical Formula 8 or Chemical Formula 9:

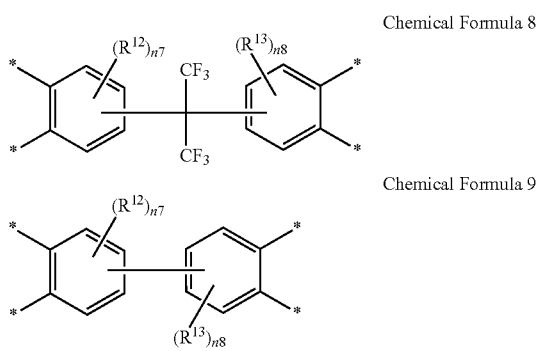

In Chemical Formulae 8 and 9, $R^{12}$, $R^{13}$, $n_7$ and $n_8$ are the same as defined in Chemical Formula 4.

In Chemical Formula 5, $R^{11}$ may be selected from chemical formulae:

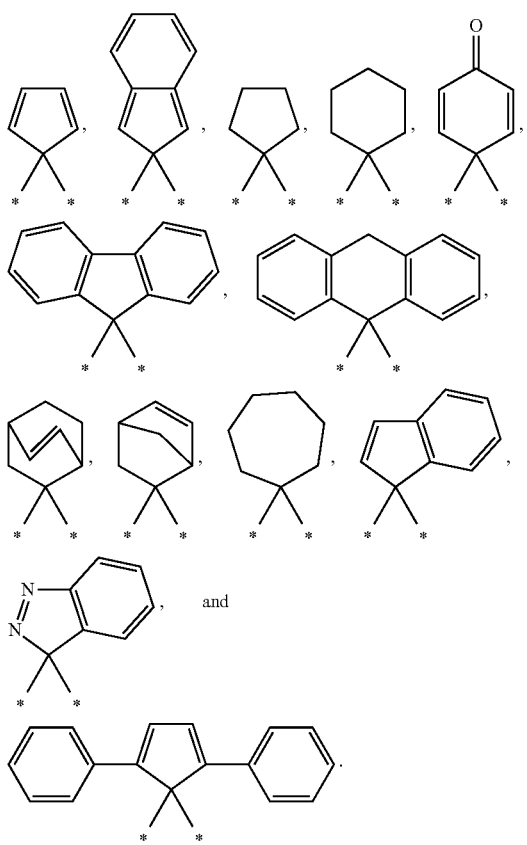

In Chemical Formula 6, $R^6$ and $R^7$ may be the same or different, and may each be independently selected from —$CF_3$, —$CCl_3$, —$CBr_3$, —$Cl_3$, —$NO_2$, —$CN$, —$COCH_3$, and —$CO_2C_2H_5$.

An amount of the inorganic particle may be less than 50 weight % based on the total weight of the composition.

According to another embodiment, provided is a polymer prepared from the composition.

The polymer prepared from the composition may be crosslinked via a plurality of the inorganic particle including two or more amino groups on the surface of each particle.

According to yet another embodiment, provided is an article including the polymer.

The article may be a film, fiber, coating material, or an adhesive.

According to yet another embodiment, provided is a display device including the article.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
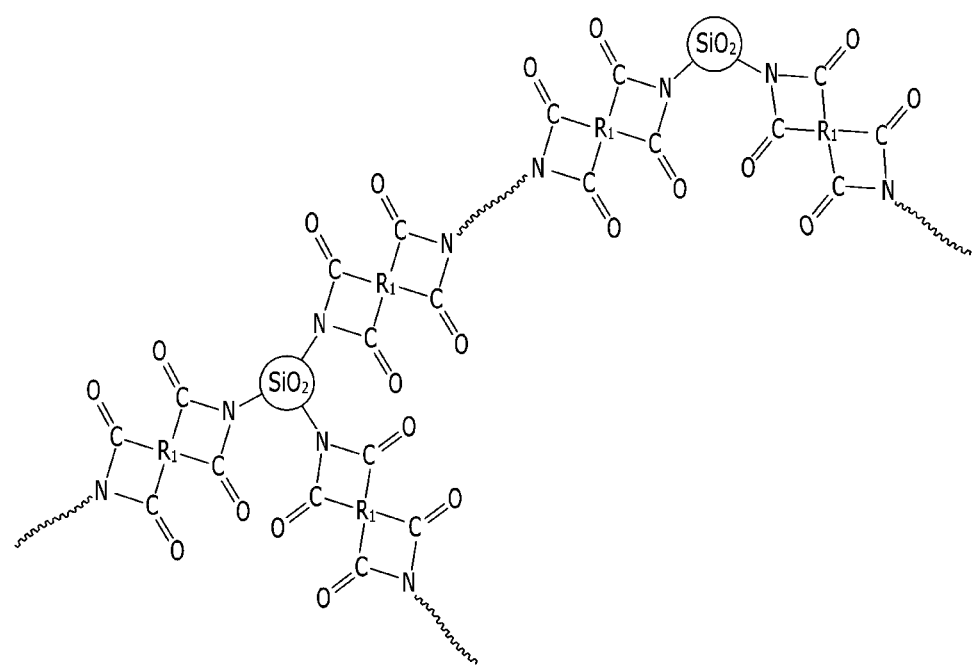
FIG. 1 is a schematic view of a polyimide according to an embodiment, in which inorganic particles ($SiO_2$) are crosslinked among the polyimide units.

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (F, Br, Cl, or I), a hydroxyl group, a nitro group, a cyano group, an amino group ($NH_2$, $NH(R^{100})$ or $N(R^{101})$ ($R^{102}$), wherein $R^{100}$, $R^{101}$, and $R^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon group having the specified number of carbon atoms and having a valence of at least one. Non-limiting examples of the alkyl group are methyl, ethyl, and propyl.

As used herein, the term "alkenyl group" refers to a straight or branched chain aliphatic hydrocarbon group including at least one double bond, and having the specified number of carbon atoms. Non-limiting examples of the alkenyl group are ethenyl and propenyl.

As used herein, the term "alkynyl group" refers to a straight or branched chain aliphatic hydrocarbon group including at least one triple bond, and having the specified number of carbon atoms. Non-limiting examples of the alkynyl group are ethynyl and propynyl.

As used herein, the term "cycloalkyl group" refers to a monovalent group having one or more saturated rings in which all ring members are carbon and having a specified number of carbon atoms. Non-limiting examples of the cycloalkyl group are cyclopentyl and cyclohexyl.

As used herein, the term "cycloalkenyl group" refers to a monovalent group having one or more rings in which all ring members are carbon, including at least one double bond, and having a specified number of carbon atoms. Non-limiting examples of the cycloalkyl group are cyclopentenyl and cyclohexenyl.

As used herein, the term "cycloalkynyl group" refers to a monovalent group having one or more rings in which all ring members are carbon including at least one triple bond, and having a specified number of carbon atoms. Non-limiting examples of the cycloalkyl group are cyclooctynyl and cyclononynyl.

As used herein, the term "aryl group" refers to an aromatic hydrocarbon containing at least one ring. Non-limiting examples of the aryl group are phenyl, naphthyl, and tetrahydronaphthyl.

As used herein, the term "aralkyl" means a substituted or unsubstituted aryl group covalently linked to an alkyl group that is linked to a compound and having a specified number of carbon atoms. Non-limiting examples of the aralkyl group are benzyl and 2-phenethyl.

As used herein, the terms "alkylene group", "alkenylene group", "alkynylene group", "cycloalkylene group", "cycloalkenylene group", "cycloalkynelene group", "arylene" group", and "aralkylene group" refer to a divalent group respectively derived from an alkyl group, a cycloalkyl group, a heterocycloalkyl group, an aryl group, and a heteroaryl group as defined above.

As used herein, when a definition is not otherwise provided, "electron-withdrawing group" refers to an atom or group that withdraws electron density from a conjugated π system via an inductive or resonance electron effect, thus making the π system more electrophilic.

As used herein, when a specific definition is not otherwise provided, the term "alkyl group" refers to a C1 to C30 alkyl group, for example a C1 to C15 alkyl group, the term "cycloalkyl group" refers to a C3 to C30 cycloalkyl group, for example a C3 to C18 cycloalkyl group, the term "alkoxy group" refer to a C1 to C30 alkoxy group, for example a C1 to C18 alkoxy group, the term "ester group" refers to a C2 to C30 ester group, for example a C2 to C18 ester group, the term "ketone group" refers to a C2 to C30 ketone group, for example a C2 to C18 ketone group, the term "aryl group" refers to a C6 to C30 aryl group, for example a C6 to C18 aryl group, the term "alkenyl group" refers to a C2 to C30 alkenyl group, for example a C2 to C18 alkenyl group, the term "alkynyl group" refers to a C2 to C30 alkynyl group, for example a C2 to C18 alkynyl group, the term "alkylene group" refers to a C1 to C30 alkylene group, for example a C1 to C18 alkylene group, and the term "arylene group" refers to a C6 to C30 arylene group, for example a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group including one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, O, S, C(=O), CH(OH), S(=O)$_2$, Si(CH$_3$)$_2$, (CH$_2$)$_p$ wherein 1≤p≤0, (CF$_2$)$_q$ wherein 1≤q≤10, C(CH$_3$)$_2$, C(CF$_3$)$_2$, and C(=O)NH, for example through S(=O)$_2$, for example an aryl group or a C6 to C30 arylene group, for example a C6 to C16 aryl group or a C6 to C16 arylene group such as phenylene.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof in one ring.

As used herein, when a definition is not otherwise provided, "combination" commonly refers to mixing or copolymerization.

In addition, in the specification, the mark "*" may refer to a point of attachment to another atom.

According to an embodiment, provided is a composition for preparing a polyimide including an oligomer having at least two ends (termini), wherein the oligomer is selected from a polyimide, a polyamic acid, a poly(imide-amic acid), or a combination thereof, and wherein at least two of the at least two ends (termini) include a dicarboxylic acid group, and an inorganic particle including a surface, wherein the surface of the inorganic particle is modified with (includes) two or more amino groups.

The inorganic particle is selected from an oxide or hydroxide of at least one element selected from Ti, Si, Al, Zr, Sn, B, and Ce, and the two or more amino groups are derived from a compound having an amino functional group.

The compound having an amino functional group is represented by Chemical Formula 1:

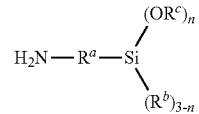

Chemical Formula 1

In Chemical Formula 1, $R^a$ may be a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted arylene, or a substituted or unsubstituted aralkylene, $R^b$ may be hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, wherein the substituent may be an acryloxy, glycidoxy, or isocyanato, $R^b$ may be hydrogen, C1 to C20 alkyl, a C2 to C20 alkenyl, a C2 to C20 alkynyl, a C3 to C20 cycloalkyl, or a C6 to C18 aryl, n is an integer ranging from 1 to 3.

The inorganic particle may be silica (SiO$_2$) or titania (TiO$_2$).

The surface of the inorganic particle may further be modified with an organic silane compound represented by Chemical Formula 2:

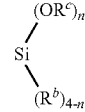

Chemical Formula 2

In Chemical Formula 2, $R^b$, $R^c$, and n are the same as defined in Chemical Formula 1.

By further being modified with the compound of Chemical Formula 2 on the surface of the inorganic particle, the size of the inorganic particle and the number of the amino groups modified on the surface of the inorganic particle may be controlled.

The inorganic particle modified with two or more amino groups on its surface or the inorganic particle modified with two or more amino groups and an organic silane represented by Chemical Formula 2 may be prepared by contacting an inorganic particle with the compound represented by Chemical Formula 1 and/or Chemical Formula 2, such that the compound represented by Chemical Formula 1 and/or Chemical Formula 2 is coated on the surface of the inorganic particle. For example, the inorganic particle modified with two or more amino groups and an organo silane compound represented by Chemical Formula 2 may be prepared by mixing a solvent containing inorganic particles, such as, for example, silica ($SiO_2$) or titania ($TiO_2$), dispersed therein with another solvent containing the compound represented by Chemical Formula 1 and/or Chemical Formula 2 dispersed therein.

Alternatively, the inorganic particle may also be prepared by mixing a precursor of an inorganic particle, such as, for example, an alkoxide, ester, acetyl acetonate, halide, nitride, etc., of an element (to be converted to an inorganic particle), with the compound represented by Chemical Formula 1 and/or Chemical Formula 2, and adding water to carry out hydrolysis of the precursor of the inorganic particle.

The inorganic particles modified with the compound represented by Chemical Formula 1 and/or the organo silane compound represented by Chemical Formula 2 may also be commercially available.

The inorganic particle modified with two or more amino groups on its surface, which may be prepared by any method described above, may be mixed with a solution containing an oligomer selected from at least one of polyimide, polyamic acid, poly(imide-amic acid), and a combination thereof, wherein at least two of the at least two ends (termini) of the oligomer include a dicarboxylic acid group, to prepare the composition according to an embodiment.

The compound represented by Chemical Formula 1 may include, for example, 3-aminopropyl trimethoxy silane, 3-aminopropyl triethoxy silane, aminophenyl methoxy silane, etc., but is not limited thereto.

The compound represented by Chemical Formula 2 may include, for example, methacryloxypropyl trimethoxy silane, (3-glycidoxypropyl) triethoxy silane, 3-isocyanatopropyl triethoxy silane, dimethyl diethoxy silane, phenyl triethoxy silane, etc., but is not limited thereto.

The oligomer in the composition may be represented by Chemical Formula 3:

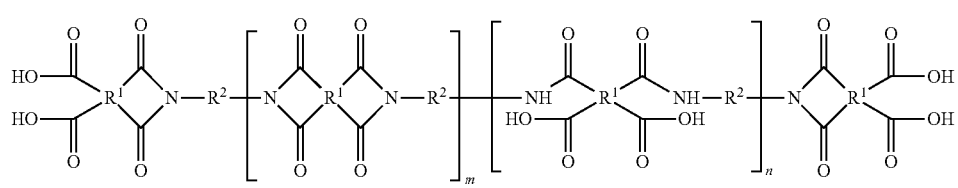

Chemical Formula 3

In Chemical Formula 3, $R^1$ is the same or different in each structural unit, and each is independently represented by any one of Chemical Formula 4-1 to Chemical Formula 4-3:

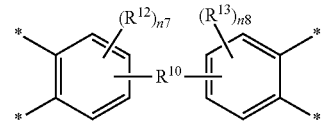

Chemical Formula 4-1

In Chemical Formula 4-1, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{205}$, wherein $R^{205}$ is a C1 to C10 aliphatic organic group, or a silyl group of formula —$SiR^{209}R^{210}R^{211}$, wherein $R^{209}$, $R^{210}$, and $R^{211}$ are the same or different and each are independently a hydrogen, or a C1 to C10 aliphatic organic group, and n7 and n8 are the same or different and each are independently an integer ranging from 0 to 3.

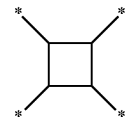

Chemical Formula 4-2

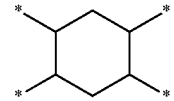

Chemical Formula 4-3

In Chemical Formula 3, $R^2$ is the same or different in each structural unit, and each is independently represented by Chemical Formula 5, Chemical Formula 6, or Chemical Formula 7:

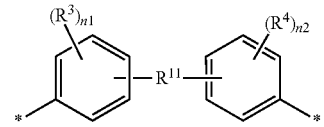

Chemical Formula 5

In Chemical Formula 5, $R^{11}$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group, $R^3$ and $R^4$ are the same or different and each are independently a halogen, a hydroxyl group, a substituted or unsubstituted C1 to C10 aliphatic organic group, a substituted or unsubstituted C6 to C20 aromatic organic group, an alkoxy group of formula $-OR^{200}$, wherein $R^{200}$ is a C1 to C10 aliphatic organic group, or a silyl group of formula $-SiR^{201}R^{202}R^{203}$, wherein $R^{201}$, $R^{202}$, and $R^{203}$ are the same or different and each are independently a hydrogen, or a C1 to C10 aliphatic organic group, and n1 and n2 are the same or different and each are independently an integer ranging from 0 to 4.

Chemical Formula 6

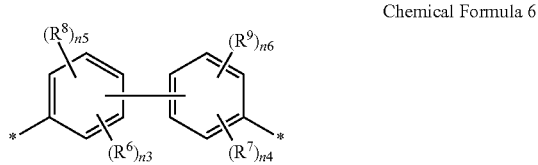

In Chemical Formula 6, $R^6$ and $R^7$ are the same or different and each are independently an electron withdrawing group, $R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula $-OR^{204}$, wherein $R^{204}$ is a C1 to C10 aliphatic organic group, or a silyl group of formula $-SiR^{205}R^{206}R^{207}$, wherein $R^{205}$, $R^{206}$ and $R^{207}$ are the same or different, and each are independently a hydrogen, a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, and n6 is an integer ranging from 0 to 3, provided that n4+n6 is an integer ranging from 1 to 4.

Chemical Formula 7

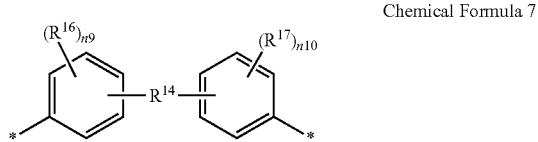

In Chemical Formula 7, $R^{14}$ is O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more moieties linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, $R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula $-OR^{212}$, wherein $R^{212}$ is a C1 to C10 aliphatic organic group, or a silyl group of formula $-SiR^{213}R^{214}R^{215}$, wherein $R^{213}$, $R^{214}$, and $R^{215}$ are the same or different, and each are independently a hydrogen or a C1 to C10 aliphatic organic group, and n9 and n10 are each independently an integer ranging from 0 to 4.

In Chemical Formula 3, each m and n indicates the mole numbers of each structural unit, and is an integer of equal to or greater than 0, provided that m+n is equal to or greater than 1.

The Chemical Formula 4-1 may be represented by Chemical Formula 8 or Chemical Formula 9:

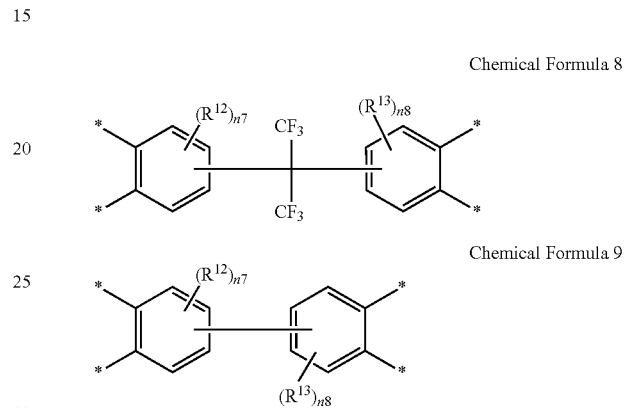

In Chemical Formulae 8 and 9, $R^{12}$, $R^{13}$, $n_7$ and $n_8$ are the same as defined in Chemical Formula 4.

In Chemical Formula 5, $R^{11}$ may be selected from chemical formulae:

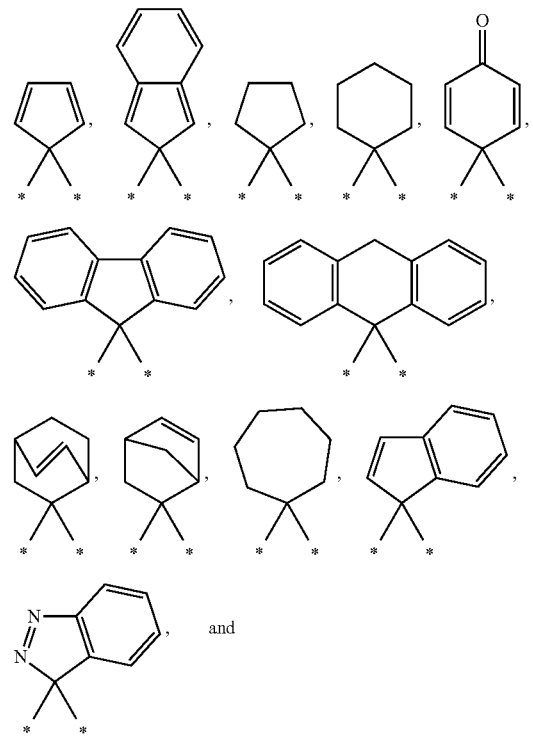

-continued

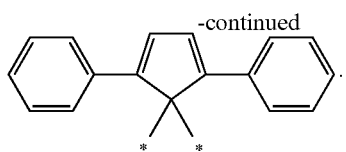

In Chemical Formula 6, $R^6$ and $R^7$ may be the same or different, and may each be independently selected from —$CF_3$, —$CCl_3$, —$CBr_3$, —$Cl_3$, —$NO_2$, —CN, —$COCH_3$, and —$CO_2C_2H_5$.

In an exemplary embodiment, $R^1$ in Chemical Formula 3 may be the same or different in each structural unit, and each may be independently represented by any one of Chemical Formula 8, Chemical Formula 9, or a Chemical Formula 4-2, wherein both n7 and n8 in Chemical Formula 8 and Chemical Formula 9 may be 0.

In another exemplary embodiment, $R^2$ in Chemical Formula 3 may be the same or different in each structural unit, and each may be independently represented by any one of Chemical Formula 6, or Chemical Formula 7, wherein all of n5, n6, n9, and n10 may be 0, both $R^6$ and $R^7$ may be —$CF_3$, and $R^{14}$ may be —$SO_2$—.

In another exemplary embodiment, $R^1$ in Chemical Formula 3 may be the same or different in each structural unit, and each may be independently represented by any one of Chemical Formula 8, or Chemical Formula 9, wherein both n7 and n8 in Chemical Formula 8, and $R^2$ in Chemical Formula 3 may be represented by Chemical Formula 6, wherein both n5, and n6 may be 0, and both $R^6$ and $R^7$ may be —$CF_3$.

In the composition according to the embodiment, the inorganic particle of which the surface is modified with two or more amino groups may be included in an amount of about not more than 50 percent by weight (weight %) based on the total weight of the composition. For example, the inorganic particle of which the surface is modified with two or more amino groups may be included in an amount of about not more than 45 weight %, for example, about not more than 35 weight %, for example, about not more than 30 weight %, for example, about not more than 25 weight %, for example, about not more than 20 weight %, for example, about not more than 15 weight %, for example, about not more than 10 weight %, for example, about not more than 5 weight %, based on the total weight of the composition.

For example, the inorganic particle of which the surface is modified with two or more amino groups may be included in an amount of about 5 weight % to about 50 weight %, for example about 5 weight % to about 45 weight %, for example about 5 weight % to about 40 weight %, for example about 5 weight % to about 35 weight %, for example about 10 weight % to about 35 weight %, for example about 10 weight % to about 30 weight %, for example about 10 weight % to about 25 weight %, or for example about 10 weight % to about 20 weight %, based on the total weight of the composition.

If the amount of the inorganic particle in the composition is less than 5 weight %, the effect of improving mechanical and chemical properties resulting from introducing the inorganic particle is insignificant. If the amount of the inorganic particle in the composition is greater than 50 weight %, the haze of the film prepared from the composition increases and the film becomes brittle.

The degree of crosslinking of the polymer prepared from the composition may vary depending on the number of the amino groups modified to the surface of the inorganic particle. For example, when using an inorganic particle modified with three amino groups, the degree of crosslinking of the polymer prepared from the composition containing the inorganic particle may be higher than when using an inorganic particle modified with two amino groups. Accordingly, the film prepared from a polymer having a higher crosslinking degree may exhibit superior mechanical and/or chemical properties due to more intimate three dimensional crosslinking.

Polyimide may be prepared by polymerizing dianhydride and diamine. In this case, the dianhydride and the diamine react in about 1:1 molar ratio, and thus, the oligomers having an amine terminus and an anhydride terminus may be mixed in about 1:1 molar ratio to prepare a polyimide. However, the amine and anhydride are very reactive towards each other, and thus, if the two oligomers having an amine terminus and an anhydride terminus are mixed at room temperature, viscosity of the mixture increases rapidly to the degree that the mixture cannot be coated. Accordingly, a mixture containing an oligomer having an amine terminus and an oligomer having an anhydride terminus in about 1:1 molar ratio cannot be stored at room temperature. Even if the mixture is stored in a refrigerator, viscosity of the mixture increases with time, and the mixture cannot be used as a coating material.

In order to solve the problem, a mixture containing an excess of any one oligomer over the other has been suggested. However, if the oligomer having an anhydride terminus is contained in excess, the anhydride reacts with water to become a carboxylic acid, which causes outgass when the carboxylic acid is decomposed at a high temperature. Further, if the oligomer having an amine terminus is contained in excess, the amine may be oxidized during precipitation and/or drying processes.

Therefore, a composition for preparing polyimide that can be stored at room temperature or in a refrigerator stably without viscosity increasing for a determined period is desired.

The composition according to the embodiment includes:

an oligomer including at least two ends (termini), wherein at least two of the at least two ends (termini) include a dicarboxylic acid group, and wherein the oligomer is selected from a polyimide, polyamic acid, poly(imide-amic acid), and a combination thereof, and an inorganic particle including a surface, wherein the surface of the inorganic particle is modified with (includes) two or more amino groups. Such a composition can be stored at room temperature for more than 350 hours without increase in viscosity.

Accordingly, the above composition does not need to be stored in a refrigerator, and can maintain appropriate viscosity applicable in spin coating to be used in a process of fabricating a film for an optical device.

For example, the viscosity of the composition may range from about 10 centipoise (cP) to about 20,000 cP.

If the viscosity is in the above range, the composition may be directly used in spin coating without further need of adjusting viscosity.

The viscosity of the composition may be controlled by adjusting the molecular weight of the oligomer. The molecular weight of the oligomer for the composition the above range of viscosity may range from about 1,000 gram per mole to about 20,000 gram per mole. If the molecular weight of the oligomer is in the above range, the composition may maintain appropriate viscosity, and thus, may be used in spin coating, and may be converted to a polyimide having improved mechanical strength and other properties.

Meanwhile, the oligomer wherein at least two of the at least two ends (termini) include a dicarboxylic acid group may be prepared by adding water to the oligomer selected from polyimide, polyamic acid, poly(imide-amic acid), and a combination thereof, in such a way that the anhydride ring at the at least two ends of the oligomer opens. The terminus having a dicarboxylic acid group prepared by the above method may revert to anhydride terminus, if necessary, by dehydrating the oligomer under heating. If the terminus of the oligomer reverts to an anhydride, the oligomer may react with the amino group modified to the surface of the inorganic particle to prepare a polyimide and/or poly(imide-amic acid).

Accordingly, in another embodiment, provided is a polyimide or poly(imide-amic acid) prepared by curing the composition.

The polyimide or poly(imide-amic acid) is a crosslinked polymer in which two or more oligomers are crosslinked via the inorganic particles modified with two or more amino groups.

As shown in FIG. 1, the polymer according to an embodiment is crosslinked by the inorganic particles, such as, for example, silica, between two or more oligomers, in which the inorganic particle links to the nitrogens at the imide termini of the oligomers. The polymer is crosslinked via the inorganic particle, and has a dense structure, whereby the polymer has further improved chemical and/or mechanical properties. Also, as the transparent polymer is linked by the inorganic particle, such as, for example, silica or titania, compatibility of the polymer and inorganic particle increases, which provides the polymer for fabricating a transparent film. In addition, as the polymer is crosslinked by the inorganic particle, the out of plane retardation ($R_{th}$) and coefficient of thermal expansion (CTE) may be reduced. Thus, the polyimide may be used in fabricating an optical display device.

According to yet another embodiment, provided is an article including the polymer. The article may be a film, a fiber, a coating material, or an adhesive.

Another embodiment provides a display device including the article.

The display device may include a liquid crystal display (LCD), an organic light emitting diode (OLED), and the like, but is not limited thereto.

Figure 2:
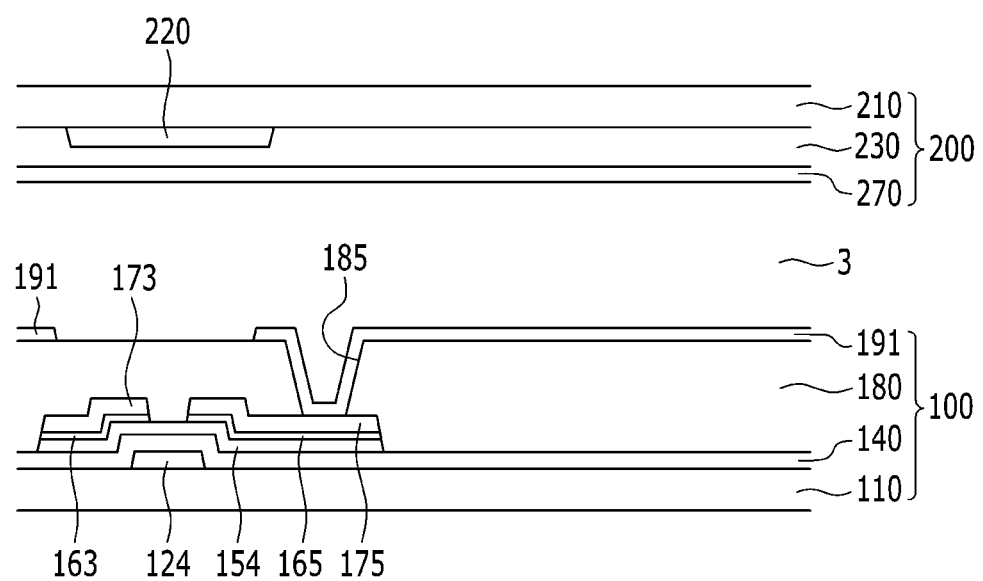
FIG. 2 is a cross-sectional view of a liquid crystal display ("LCD") in accordance with an embodiment.

Among the display devices, a liquid crystal display (LCD) is described by referring to FIG. 2. FIG. 2 is a cross-sectional view of a liquid crystal display (LCD) in accordance with an embodiment.

Referring to FIG. 2, the liquid crystal display (LCD) includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110. The source electrode 173 and the drain electrode 175 are isolated from each other and face each other with the gate electrode 124 disposed between them.

One gate electrode 124, one source electrode 173, and one drain electrode 175 constitute one thin film transistor (TFT) together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as ITO or IZO is disposed on the protective layer 180. The pixel electrode 191 is connected to the drain electrode 175 through the contact hole 185.

The common electrode panel 200 will now be described in detail.

In the common electrode panel 200, a lighting member 220 referred to as a black matrix is disposed on a substrate 210, a color filter 230 is disposed on the substrate 210 and the lighting member 220, and a common electrode 270 is formed on the color filter 230.

Herein, the substrates 110 and 210 may be articles including the composite including the poly(amide-imide) copolymer and inorganic particles.

Figure 3:
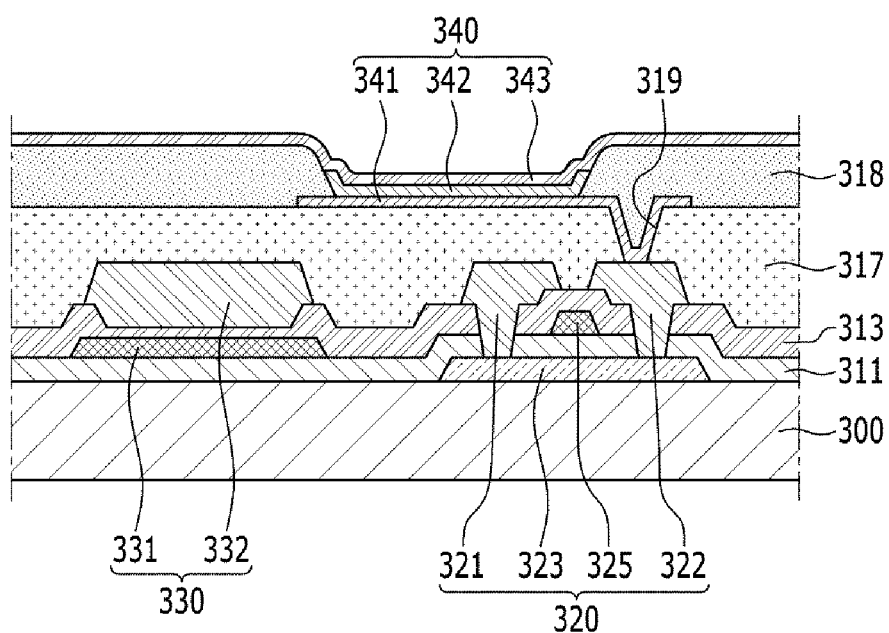
FIG. 3 is a cross-sectional view of an organic light emitting diode ("OLED") in accordance with an embodiment.

Among the display devices, an organic light emitting diode (OLED) is described by referring to FIG. 3. FIG. 3 is a cross-sectional view of an organic light emitting diode (OLED) in accordance with an embodiment.

Referring to FIG. 3, a thin film transistor 320, a capacitor 330, and an organic light emitting element 340 are formed on a substrate 300. The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342, and an opposed electrode 343.

According to an embodiment, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300. The source electrode 321 and the drain electrode 322 are isolated from each other, and face each other with the gate electrode 325 disposed between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be a part of an article including the composite including the poly(amide-imide) copolymer and inorganic particles.

Hereafter, the embodiments are described in detail with reference to examples. The following examples and comparative examples are not restrictive, but are illustrative.

EXAMPLES

Synthesis Examples 1 to 6: Preparation of Oligomeric Amic Acid Having Anhydride Termini 9.1266 g (0.0285 mole) of TFDB was dissolved in 50 mL of NMP in 250 mL 4-neck double walled reactor, equipped with mechanical stirrer and nitrogen inlet at 20° C. under nitrogen atmosphere. 13.327 g (0.03 mole) of 6-FDA and 26 mL of NMP were added. The mixture was stirred for 24 hrs at 20° C. under nitrogen atmosphere to prepare an oligomeric amic acid having anhydride termini (PI-239). Solid content of the oligomeric amic acid solution was 22 weight % (Synthesis Example 1).

Another oligomeric amic acid having anhydride termini was prepared using the same method as in Synthesis Example 1, except for using 0.0291 mole of TFDB, instead of 0.0285 mole of TFDB. Solid content of the oligomeric amic acid solution was 22 weight % (Synthesis Example 2).

Another oligomeric amic acid having anhydride termini (PI-242) was prepared using the same method as in Synthesis Example 1, except for using 0.006 mole of 6-FDA and 0.024 mole of BPDA, instead of 0.03 mole of 6-FDA (Synthesis Example 3).

Another oligomeric amic acid having anhydride termini was prepared using the same method as in Synthesis Example 3, except for using 0.0291 mole of TFDB as a diamine (Synthesis Example 4).

Another oligomeric amic acid having anhydride termini was prepared using the same method as in Synthesis Example 1, except for using 0.02375 mole of TFDB as a diamine, and 0.025 mole of CBDA (Cyclobutane-1,2,3,4-tetracarboxylic dianhydride) as an anhydride (Synthesis Example 5).

Further, another oligomeric amic acid having anhydride termini was prepared using the same method as in Synthesis Example 5, except for using 0.02425 mole of TFDB as a diamine (Synthesis Example 6).

Synthesis Example 7: Preparation of Oligomeric Amic Acid Having an Anhydride Terminus and an Amine Terminus 8.0058 g (0.025 mole) of TFDB was dissolved in 60 mL of NMP in 250 mL 4-neck double walled reactor, equipped with mechanical stirrer and nitrogen inlet at 20° C. under nitrogen atmosphere. 5.8845 g (0.02 mole) of BPDA, 2.2212 g (0.005 mole) of 6-FDA, and 22 mL of NMP were added. The mixture was stirred for 24 hrs at 20° C. under nitrogen atmosphere to prepare an oligomeric amic acid having an anhydride terminus and an amine terminus in a molar ratio of 1:1 (Synthesis Example 7).

Synthesis Examples 8 to 13: Preparation of Oligomeric Amic Acid Having Dicarboxylic Acid Group at the Termini 0.054 ml (0.003 mole), 0.032 ml (0.0018 mole), 0.054 ml (0.003 mole), 0.032 ml (0.0018 mole), 0.045 ml (0.0025 mole), and 0.027 ml (0.0015 mole) of water were added to the oligomeric amic acid solutions according to Synthesis Examples 1 to 6, respectively, and each mixture was stirred for 26 hours at room temperature to convert the anhydride at terminus to dicarboxylic acid, thereby forming oligomeric amic acid having two carboxylic acid groups at the termini (PI-215, PI-216, PI-217, PI-218, PI-226, and PI-227) according to Synthesis Examples 8 to 13.

Table 1 below shows components of the oligomeric amic acids, solid content of the oligomeric amic acids in solution, and the ratio between dianhydride and diamine in each oligomeric amic acid.

Figure 4:
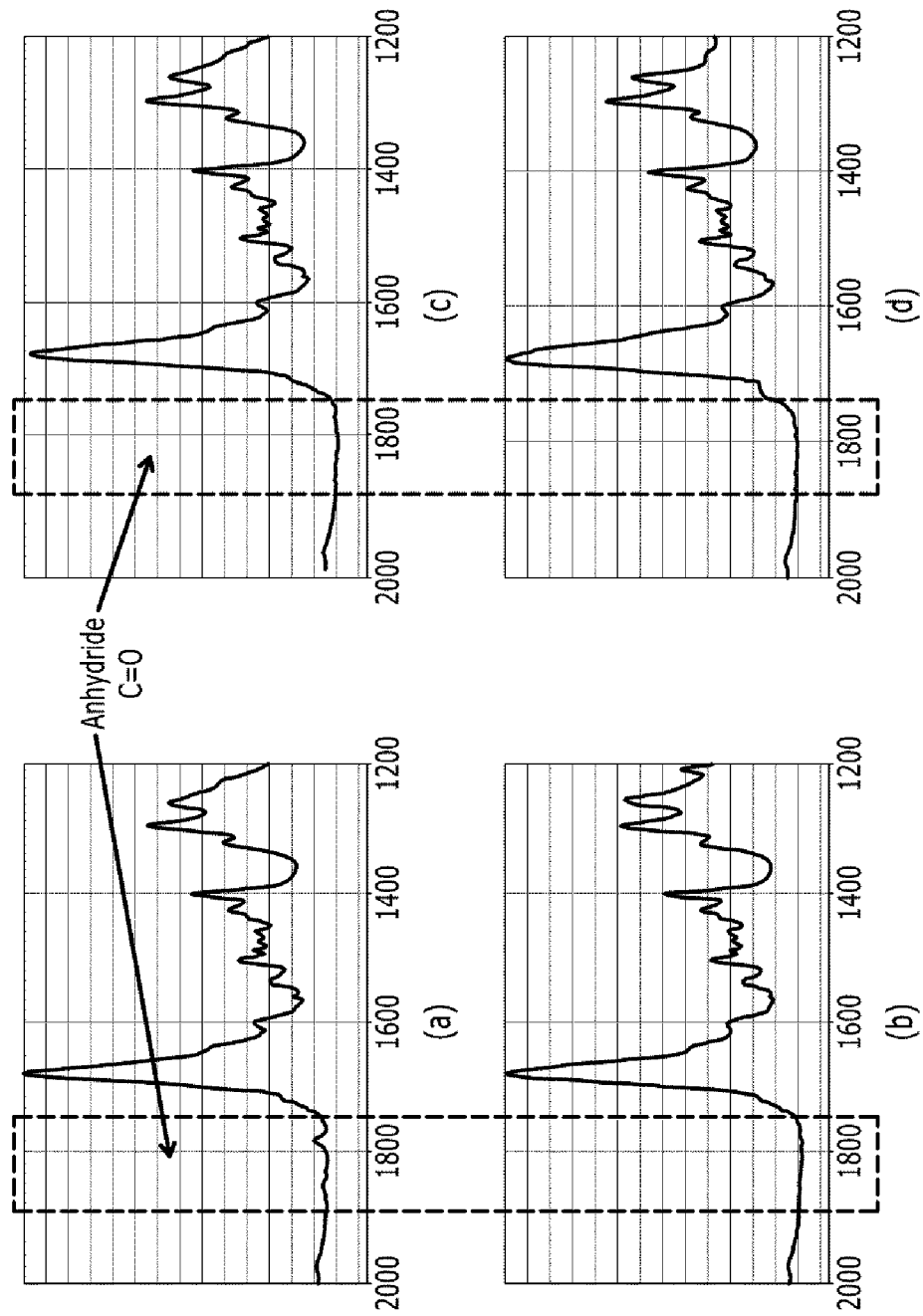
FIG. 4 is an FT-IR graph of intensity (arbitrary unit, a. u.) versus wavenumber (reverse centimeters, $cm^{-1}$) showing conversion of the anhydride group at the end of an oligo amic acid to dicarboxyl groups, in which (a) is an FT-IR graph of the oligo amic acid having anhydride termini prepared in Synthesis Example 1, and (b) to (d) are the FT-IR graphs of the oligomers according to Synthesis Example 8 (b), Synthesis Example 10 (c), and Synthesis Example 12(d) prepared by hydrolyzing the anhydrides at terminal ends of the oligo amic acids according to Synthesis Example 2, Synthesis Example 4, and Synthesis Example 6, respectively.
Figure 5:
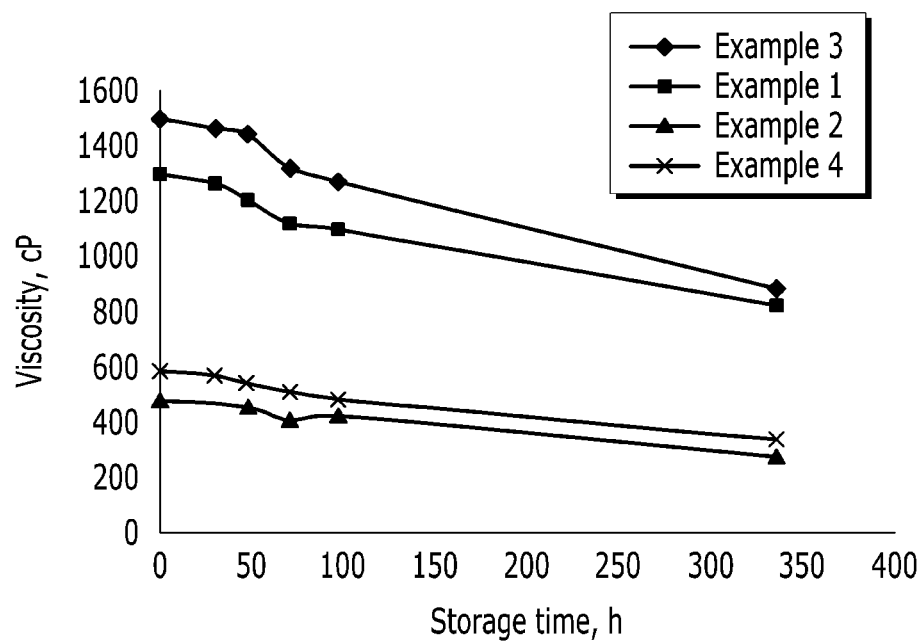
FIG. 5 shows graphs of viscosity (centipoise, cP) versus storage time (hour, h) illustrating viscosity changes at room temperature versus storage time of the compositions according to Examples 1 to 4.
Figure 6:
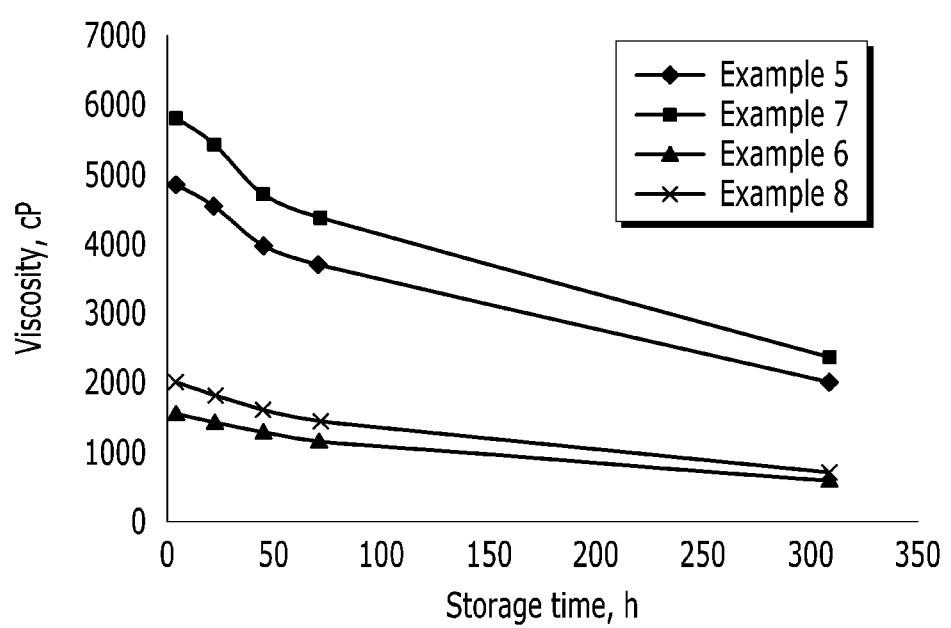
FIG. 6 shows graphs of viscosity (centipoise, cP) versus storage time (hour, h) illustrating viscosity changes at room temperature versus storage time of the compositions according to Examples 5 to 8.
Figure 7:
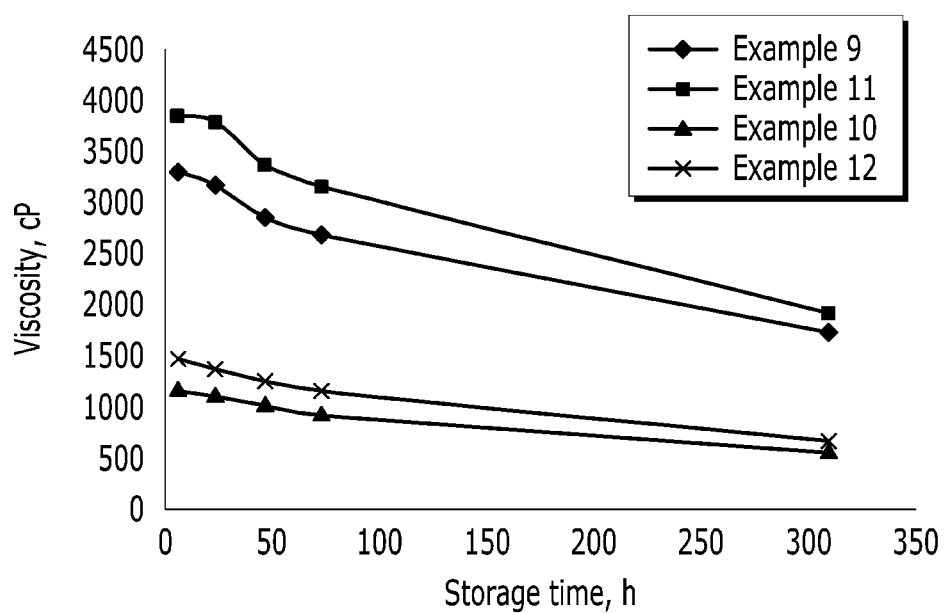
FIG. 7 shows graphs of viscosity (centipoise, cP) versus storage time (hour, h) illustrating viscosity changes at room temperature versus storage time of the compositions according to Examples 9 to 12.
Figure 8:
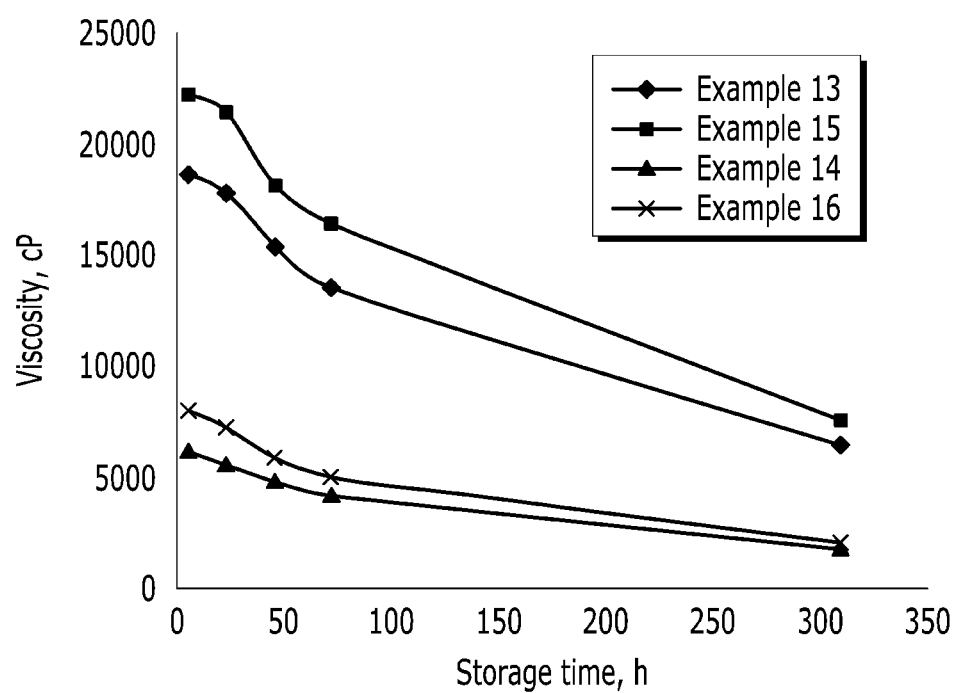
FIG. 8 shows graphs of viscosity (centipoise, cP) versus storage time (hour, h) illustrating viscosity changes at room temperature versus storage time of the compositions according to Examples 13 to 16.

Completeness of the conversion of an anhydride at a terminus to a dicarboxylic acid is confirmed by an FT-IR spectroscopy. That is, referring to FIG. 4 (a), which shows the FT-IR graph of the oligomeric amic acid having anhydride termini according to Synthesis Example 1, there is a peak indicating a carbonyl (C=O) group of an anhydride at about 1,780 $cm^{-1}$. However, none of the FT-IR graphs of the oligomeric amic acids having dicarboxylic acids termini according to Synthesis Examples 9, 11, and 13 (FIG. 4(b), FIG. 4(c), and FIG. 4(d), respectively) shows the peak at about 1,780 $cm^{-1}$ as shown in FIG. 4(a).

TABLE 1

|  | Dianhydride/ Diamine ratio (molar ratio) | Solid Content (weight %) | Content of Dianhydride (mole) | | | Content of TFDB (mole) |
| --- | --- | --- | --- | --- | --- | --- |
|  |  |  | 6-FDA | BPDA | CBDA |  |
| Syn. Exa. 8 | 1:0.95 | 25 | 0.03 | — | — | 0.0285 |
| Syn. Exa. 9 | 1:0.97 | 25 | 0.03 | — | — | 0.0291 |
| Syn. Exa. 10 | 1:0.95 | 22 | 0.006 | 0.024 | — | 0.0285 |
| Syn. Exa. 11 | 1:0.97 | 22 | 0.006 | 0.024 | — | 0.0291 |
| Syn. Exa. 12 | 1:0.95 | 25 | — | — | 0.025 | 0.02375 |
| Syn. Exa. 13 | 1:0.97 | 22 | — | — | 0.025 | 0.02425 |

Experimental Example 1: Viscosity Change of Oligomers

The oligomer having anhydrides at both termini (PI-242) prepared in Synthesis Example 3 and the oligomer having dicarboxylic acids at both termini (PI-217) prepared in Synthesis Example 10 are respectively mixed with TAPOB (1,3,5-tris(4-amino-phenoxy)benzene), a tris amine compound, and then the viscosity changes are determined. Particularly, when the mixture of the oligomer according to Synthesis Example 3 and the tris amine compound is stored at room temperature, the viscosity of the mixture right after mixing is about 4,000 cP, but it increases to about 1,800,000 cP within 1 minute, and then the mixture turned into a gel in 2.5 hours. However, when the mixture of the oligomer according to Synthesis Example 10 and the tris amine compound is stored at room temperature, the viscosity of the mixture right after mixing is about 15,000 cP, and increases to about 23,000 cP in 2.5 hours, but it does not increase any more for about 20 hours. That is, it is confirmed that the oligomer having dicarboxylic acids at both termini has improved storage stability at room temperature, compared with the oligomer having anhydrides at both termini. The viscosity changes of the oligomers according to Synthesis Examples 3 and 10 after mixing with TAPOB, the tris amine compound, are respectively shown in Table 2 below.

TABLE 2

| Time after mixing (hour) | Viscosity of the mixture containing oligomer of Syn. Exa. 10 (cP) | Viscosity of the mixture containing oligomer of Syn. Exa. 3 (cP) |
|---|---|---|
| 0 | 15,560 | 4,274 |
| 0.02 | 15,540 | 1,840,000 |
| 2.5 | 23,270 | Gel |
| 19.8 | 23,590 | Gel |

Synthesis Example 14: Synthesis of Amino-Functionalized Silica Sol (Sol 28)

TEOS (tetraethyl orthosilicate), APS (3-aminopropyl triethoxy silane), DMDES (dimethyl diethoxy silane), and DMAc (N,N-dimethyl acetamide) are mixed in amount of 10 g, 1.6155 g, 9.6378 g, and 48.7 g, respectively, to prepare inorganic particle, of which the surface is modified with amino groups. Then, 7.7841 g of HCl (1 M) is added dropwise to the solution. The solution is stirred for 2 days to prepare a sol, Sol 28. The size of the particle is measured with "Otsuka particle size analyzer". Average particle diameter is about 3.2 nanometers.

Synthesis Example 15: Synthesis of Amino-functionalized Silica Sol (Sol 29)

TEOS (tetraethyl orthosilicate), APS (3-aminoropyl triethoxy silane), PhTES (Phenyl Triethoxy Silane), and DMAc (N,N-dimethyl acetamide) are mixed in amount of 10 g, 1.6155 g, 15.789 g, and 45.6 g, respectively, to prepare inorganic particle, of which the surface is modified with amino groups. Then, 8.111 g of HCl (1M) is added dropwise to the solution. The solution is stirred for 2 days to prepare a sol, Sol 29. The size of the particle is measured with "Otsuka particle size analyzer". Average particle diameter is about 3.4 nanometers.

Examples 1 to 24: Preparation of Compositions of Oligo Amic Acids-Silica Nanoparticles Compositions of oligo amic acid-silica nanoparticle according to Examples 1 to 24 are prepared by mixing the oligo amic acids (PI-215, PI-216, PI-217, PI-218, PI-226, and PI-227) having dicarboxylic acids at both termini according to Synthesis Examples 8 to 13 and the silica sols containing silica nanoparticles of which the surface is modified with amino groups (Sol 28 and Sol 29) prepared in Synthesis Examples 14 and 15. Components of the compositions according to Examples 1 to 24 are shown in Table 3 below.

The composition according to Comparative Example 1 is also prepared by mixing the oligomeric amic acid (PI-214) according to Synthesis Example 3, in which the termini of the oligomeric amic acid do not include a dicarboxylic acid group, and the silica sol (Sol 29) according to Synthesis Example 15.

TABLE 3

| | Oligomeric amic acid | | Sol | | Silica Content[a], weight % | Solid content, weight % |
|---|---|---|---|---|---|---|
| | | Content, g | Type | Content, g | | |
| Exa. 1 | Syn. Exa. 8 | 10 | Syn. Exa. 14 | 2.5 | 10 | 22 |
| Exa. 2 | Syn. Exa. 8 | 10 | Syn. Exa. 14 | 5 | 20 | 20 |
| Exa. 3 | Syn. Exa. 8 | 10 | Syn. Exa. 15 | 2.5 | 10 | 22 |
| Exa. 4 | Syn. Exa. 8 | 10 | Syn. Exa. 15 | 5 | 20 | 20 |
| Exa. 5 | Syn. Exa. 9 | 10 | Syn. Exa. 14 | 2.5 | 10 | 22 |
| Exa. 6 | Syn. Exa. 9 | 10 | Syn. Exa. 14 | 5 | 20 | 20 |
| Exa. 7 | Syn. Exa. 9 | 10 | Syn. Exa. 15 | 2.5 | 10 | 22 |
| Exa. 8 | Syn. Exa. 9 | 10 | Syn. Exa. 15 | 5 | 20 | 20 |
| Exa. 9 | Syn. Exa. 10 | 10 | Syn. Exa. 14 | 2.2 | 10 | 20 |
| Exa. 10 | Syn. Exa. 10 | 10 | Syn. Exa. 14 | 4.4 | 20 | 18 |
| Exa. 11 | Syn. Exa. 10 | 10 | Syn. Exa. 15 | 2.2 | 10 | 20 |
| Exa. 12 | Syn. Exa. 10 | 10 | Syn. Exa. 15 | 4.4 | 20 | 18 |
| Exa. 13 | Syn. Exa. 11 | 10 | Syn. Exa. 14 | 2.2 | 10 | 20 |
| Exa. 14 | Syn. Exa. 11 | 10 | Syn. Exa. 14 | 4.4 | 20 | 18 |
| Exa. 15 | Syn. Exa. 11 | 10 | Syn. Exa. 15 | 2.2 | 10 | 20 |
| Exa. 16 | Syn. Exa. 11 | 10 | Syn. Exa. 15 | 4.4 | 20 | 18 |
| Exa. 17 | Syn. Exa. 12 | 5 | Syn. Exa. 14 | 1.25 | 10 | 22 |
| Exa. 18 | Syn. Exa. 12 | 5 | Syn. Exa. 14 | 2.5 | 20 | 20 |
| Exa. 19 | Syn. Exa. 12 | 5 | Syn. Exa. 15 | 1.25 | 10 | 22 |
| Exa. 20 | Syn. Exa. 12 | 5 | Syn. Exa. 15 | 2.5 | 20 | 20 |
| Exa. 21 | Syn. Exa. 13 | 5 | Syn. Exa. 14 | 1.1 | 10 | 20 |
| Exa. 22 | Syn. Exa. 13 | 5 | Syn. Exa. 14 | 2.2 | 20 | 18 |
| Exa. 23 | Syn. Exa. 13 | 5 | Syn. Exa. 15 | 1.1 | 10 | 20 |
| Exa. 24 | Syn. Exa. 13 | 5 | Syn. Exa. 15 | 2.2 | 20 | 18 |
| Com. Exa. 1 | Syn. Exa. 1 | 10 | Syn. Exa. 15 | 4.4 | 20 | 18 |

[a]Theoretical value

Experimental Example 2: Storage Stability of Compositions According to the Examples and Comparative Example 1

Figure 9:
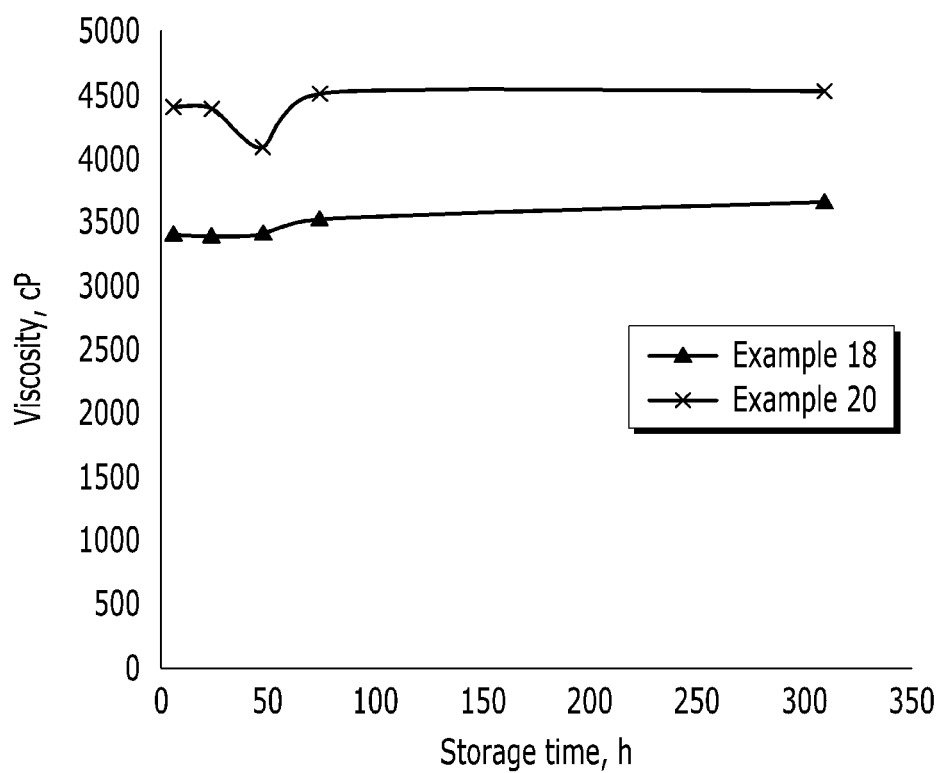
FIG. 9 shows graphs of viscosity (centipoise, cP) versus storage time (hour, h) illustrating viscosity changes at room temperature versus storage time of the compositions according to Examples 18 to 20.
Figure 10:
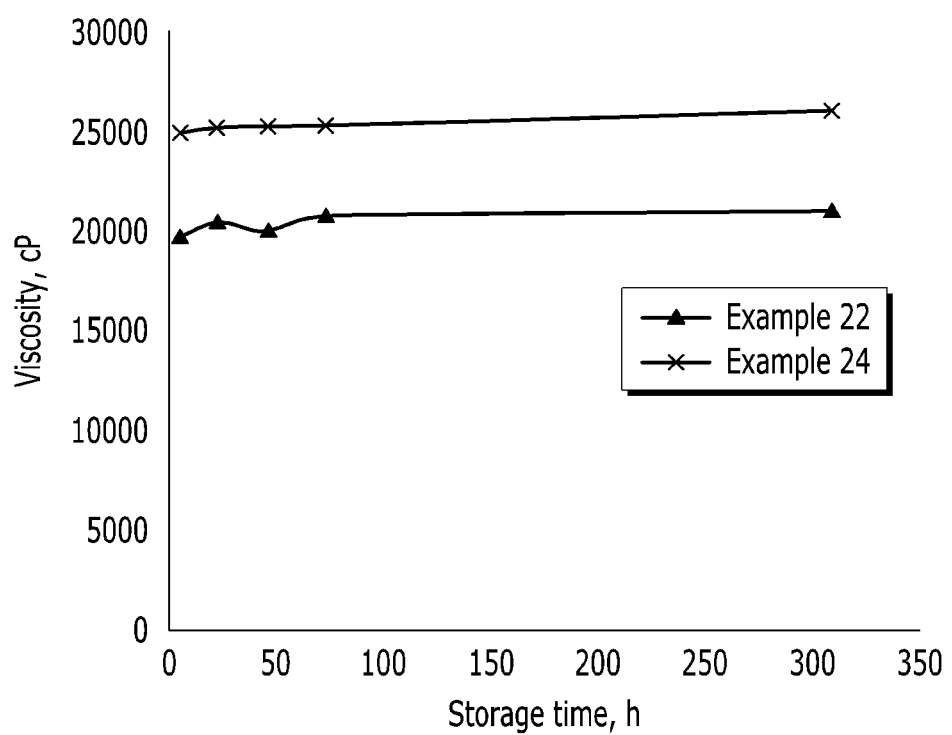
FIG. 10 shows graphs of viscosity (centipoise, cP) versus storage time (hour, h) illustrating viscosity changes at room temperature versus storage time of the compositions according to Examples 22 to 24.

The storage stability at room temperature is measured with respect to the compositions according to Examples 1 to 16, 18, 20, 22, and 24. That is, the viscosity changes at room temperature of the compositions depending on time are measured, and the results are shown in FIGS. 5 to 10. As shown from FIGS. 5 to 8, the viscosity of these compositions does not increase for about 350 hours, but instead, there is a tendency that the viscosity of the compositions gradually decrease when stored at room temperature due to the reverse reaction of the oligomers in the compositions. As for the compositions according to Examples 18, 20, 22, and 24, as shown in FIGS. 9 and 10, the viscosity hardly increases. From these results, it is confirmed that the compositions including oligomers and inorganic particles according to an embodiment do not undergo gelation reaction, but remain stable at room temperature.

Preparation Example: Fabrication of Polyimide-Silica Nanocomposite Films and Evaluation Thereof Polyimide-silica nanocomposite films are prepared from the compositions according to the Examples and Comparative Example 1. Particularly, each of the polyamic acid oligomers according to Synthesis Examples 8 to 13 dissolved in NMP is placed into a 20 mL vial, and the silica nanoparticle sols according to Synthesis Examples 14 and 15 are added thereto. That is, the polyimide nanocomposite films are prepared from the compositions according to Examples 1 to 24. The hybrid solutions are mechanically stirred by using a rotary mixer, and the obtained solutions are casted onto a glass plate by spin-coating to fabricate the films. Thus obtained films are dried stepwise. Drying conditions are as follows: maintain for 30 minutes at 80° C., then temperature is increased to 300° C. at heating rate of 3° C./min, and then maintain for 60 minutes at 300° C.

Table 4 below shows the components, thicknesses, and optical properties of the films.

Meanwhile, in Table 4, Comparative Example 2 indicates the film prepared by using the same method as above and using the oligomeric amic acid of Synthesis Example 1, of which both ends are anhydrides, not dicarboxylic acids, and the silica nanoparticle sol according to Synthesis Example 15. Silica content in the composition according to Comparative Example 2 is 20 weight %. Further, in Table 4, Comparative Example 3 indicates the film prepared by using the same method as above and using only the oligomeric amic acid of Synthesis Example 7, of which one end is an anhydride and the other end is an amine, as the molar ratio of the diamine and dianhydride is 1:1. That is, in Comparative Example 3, silica content in the composition is 0 weight %. In addition, in Table 4, Comparative Example 4 indicates the film prepared by using the same method as above and using only the oligomeric amic acid of Synthesis Example 12, of which both ends are anhydrides without silica nanoparticles. That is, in Comparative Example 4, silica content in the composition is 0 weight %.

In table 4, thickness and optical properties of the films are measured as below.

The thickness is measured with "mitutoyo" micrometer tool with the accuracy of ±1 μm.

Optical properties are measured with "Konica Minolta CM3600d" spectrophotometer on the transmittance opacity/haze mode.

The refractive indexes and birefringence of the nanocomposites are measured on prism coupler (Metricon MODEL 2010/M) at a wavelength of 633 nm. $R_{th}$ was calculated with a following equation:

$$R_{th}=(n(TE)-n(TM))*d$$

wherein

"n(TE)" and "n(TM)" are in-plane and out of plane refractive indexes, respectively, and "d" is the film thickness.

TABLE 4

|  | Thickness (μm) | Total Transmittance (%) | Y.I. (%) | Hz (%) | Transmittance at 430 nm (%) | Total Transmittance calculated to 10 μm (%) | Transmittance at 430 nm calculated to 10 μm (%) | Δn ($R_{th}$, nm) |
|---|---|---|---|---|---|---|---|---|
| Exm. 4 | 40 | 87.99 | 9.69 | 6.7 | 75.55 | 88.75 | 85.33 | 0.00175 |
| Exm. 7 | 19 | 89.05 | 3.69 | 4.28 | 84.15 | 89.03 | 85.68 | 0.00653 |
| Exm. 8 | 19 | 89.34 | 3.52 | 8.79 | 84.49 | 89.18 | 85.86 | 0.00568 |
| Com. Exm. 2 | 35 | 88.65 | 9.34 | 7.02 | 76.54 | 88.90 | 84.15 | 0.00214 |
| Exm. 9 | 21 | 88.9 | 4.88 | 1.03 | 82.6 | 88.9 | 85.7 | 0.02243 |
| Exm. 10 | 14 | 89.9 | 2.69 | 1.2 | 86.2 | 89.6 | 86.6 | 0.01136 (159) |
| Exm. 11 | 28 | 88.8 | 4.17 | 1.14 | 83.4 | 88.9 | 86.0 | 0.01675 |
| Exm. 12 | 16 | 89.1 | 2.74 | 1.68 | 85.4 | 89.0 | 86.1 | 0.01344 |
| Com. Exm. 3 | 38 | 88.6 | 4.5 | 0.36 | 83.2 | 88.9 | 86.3 | 0.02950 (1121) |
| Exm. 17 | 19 | 87.87 | 7.51 | 0.31 | 78.49 | 88.40 | 82.59 | 0.04563 |
| Exm. 18 | 12 | 87.74 | 7.75 | 0.67 | 78.04 | 87.95 | 79.53 | 0.03883 |
| Exm. 19 | 21 | 87.76 | 7.53 | 0.21 | 78.35 | 88.41 | 82.97 | 0.04262 |
| Exm. 21 | 20 | 87.22 | 9.69 | 0.57 | 75.21 | 88.11 | 81.08 | 0.07590 |
| Exm. 22 | 19 | 87.71 | 9.69 | 0.43 | 75.52 | 88.32 | 80.93 | 0.01816 |
| Com. Exm. 4 | Very brittle | — | — | — | — | — | — | — |

As shown from Table 4, the polyimide films prepared from the compositions according to the embodiment exhibit greatly improved out of plane retardation ($R_{th}$). Particularly, while the films according to Example 4 and Comparative Example 2 are fabricated from the oligomers having the same diamines and dianhydrides, the oligomers have different termini, as the oligomer according to Example 4 has a dicarboxylic acid group at the termini, and the oligomer according to Comparative Example 2 has an anhydride group at termini. Thus, the $R_{th}$ of the film according to Example 4 is much lower than that of the film according to Comparative Example 2.

Further, the film according to Comparative Example 3, prepared only from the oligomer wherein each of the two ends (termini) does not include a dicarboxylic group and having no silica nanoparticles, exhibits much higher $R_{th}$ than that of the film according to Example 10. The film according to Example 10 is fabricated from the oligomer of the same diamine and dianhydride as those of the oligomer of Comparative Example 3, but each of the two ends (termini) of the oligomer of Example 10 has a dicarboxylic acid group, and includes 20 weight % of silica nanoparticles. Particularly, the $R_{th}$ of the film according to Comparative Example 3 is 1,121 nm, while that of the film according to Example 10 is 159 nm. Therefore, the film according to the embodiment exhibit very low optical anisotropy.

Meanwhile, while the films according to Examples 17 to 19 and the film according to Comparative Example 4 are fabricated from the same oligomers of the same diamine and dianhydride as each other, the film according to Comparative Example 4 is very brittle, as it does not contain silica nanoparticle. The mechanical property of this film is poor.

Accordingly, it is confirmed that the films according to an embodiment has good optical properties, such as low anisotropy, high light transmittance, low yellowness index (YI), and the like, as well as good mechanical strength.

The thermal properties of the films according to Examples 10 and 14 prepared by using the above method are summarized in Table 5 below. Further, for comparison, the thermal properties of the film according to Comparative Example 3 as described above are also summarized in Table 5.

The thermal properties are measured as below.

CTE is measured on TMA Q400 (TA Instruments, U.S.A.) with the following heating program. The value is obtained in the second scanning. The measurement range is 50~150° C., 50~250° C., 50~300° C., 50~350° C., and 50~400° C.

First scanning: 5 minute isothermal→rump to 300° C. at a heating rate of 5° C./min.→cooling to 40° C.

Second scanning: rump to 400° C. at a heating rate of 5° C./min.

TGA (Thermal Gravity Analysis) curves are measured by TGA Q800 (TA Instruments, U.S.A.) using 10 mg to 15 mg of samples in $Al_2O_3$ crucible heated from 25° C. to 600° C. at a heating rate of 10° C./min under nitrogen atmosphere with a gas flow rate of 70 mL/min. The polymer decomposition temperature ($T_d$) is determined at the weight loss of 0.1%, 1%, and 5%.

TABLE 5

| | CTE, ppm/° C. | | | | | | |
|---|---|---|---|---|---|---|---|
| | 50~150° C. | 50~250° C. | 50~300° C. | 50~350° C. | 50~400° C. | Tg**, ° C. | Td 1%, ° C. |
| Exa. 10 | 33.5 | 49.3 | 59.1 | 77.2 | 118.9 | — | 455 |
| Exa. 14 | 41.9 | 61.1 | 69.6 | 93.8 | 136.1 | — | 471 |
| Com. Exa. 3 | 16.9 | 27.6 | 33.4 | 261.7 | 861.2 | 336 | 514 |

As shown from Table 5, the polyimides crosslinked via inorganic particles exhibit good coefficient of thermal expansions (CTEs) at high temperature range (50° C. to 400° C.). Without bound by any specific theory, the good CTE may result from extinction of glass transition temperature of the polyimide due to introduction of the inorganic particles. Meanwhile, the CTE may further be improved by reducing the molecular weight of the oligomers.

ABBREVIATIONS

TFDB=2,2'-bis(trifluoromethyl)benzidine
BPDA=3,3',4,4'-biphenyl tetracarboxylic dianhydride
6-FDA=2,2-bis-(3,4-dicarboxyphenyl)hexafluoropropane dianhydride
CBDA=cyclobutane tetracarboxylic dianhydride
NMP=N-methylpyrrolidone While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composition for preparing a polyimide comprising an oligomer comprising at least two termini, wherein the oligomer is selected from a polyimide, a polyamic acid, a poly(imide-amic acid), and a combination thereof, and wherein at least two of the at least two termini comprise a dicarboxylic acid group; and
an inorganic particle prepared by only reacting an orthosilicate, a compound of Chemical Formula 1, and an organo silane compound represented by Chemical Formula 2, wherein the inorganic particle comprises a surface comprising two or more amino groups derived from a compound of Chemical Formula 1 and further comprising a residue derived from an organo silane compound represented by Chemical Formula 2:

Chemical Formula 1 wherein, in Chemical Formula 1,
$R^a$ is a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted arylene, or a substituted or unsubstituted aralkylene,
$R^b$ is hydrogen, a substituted or unsubstituted C1 to C20 alkyl, a substituted or unsubstituted C2 to C20 alkenyl, a substituted or unsubstituted C2 to C20 alkenyl, a substituted or unsubstituted C3 to C20 cycloalkyl, or a substituted or unsubstituted C6 to C18 aryl, wherein the substituent is selected from an acryloxy, glycidoxy, and isocyanato,
$R^c$ is hydrogen, a C1 to C20 alkyl, a C2 to C20 alkenyl, a C2 to C20 alkynyl, a C3 to C20 cycloalkyl, or a C6 to C18 aryl, and
n is an integer ranging from 1 to 3; and

Chemical Formula 2 wherein, in Chemical Formula 2, $R^b$ is hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, wherein the substituent is selected from an acryloxy, glycidoxy, and isocyanato, $R^c$ is hydrogen, a C1 to C20 alkyl, a C2 to C20 alkenyl, a C2 to C20 alkynyl, a C3 to C20 cycloalkyl, or a C6 to C18 aryl, and n is an integer ranging from 1 to 3.

2. The composition of claim 1, wherein the compound of Chemical Formula 1 is selected from 3-aminopropyltrimethoxy silane, 3-aminopropyl triethoxy silane, aminophenyl trimethoxy silane, and a combination thereof.

3. The composition of claim 1, wherein the inorganic particle is an oxide or hydroxide of selected from Ti, Si, Al, Zr, Sn, B, Ce, and a combination thereof.

4. The composition of claim 1, wherein the inorganic particle is silica ($SiO_2$), or titania ($TiO_2$).

5. The composition of claim 1, wherein the compound of Chemical Formula 2 is selected from methacryloxypropyl trimethoxy silane, (3-glycidoxypropyl) triethoxy silane, 3-isocyanatopropyl triethoxy silane, dimethyl diethoxy silane, phenyl triethoxy silane, and a combination thereof.

6. The composition of claim 1, wherein the oligomer is represented by Chemical Formula 3:

group, or a silyl group of formula $-SiR^{209}R^{210}R^{211}$, wherein $R^{209}$, $R^{210}$, and $R^{211}$ are the same or different and each are independently a hydrogen, or a C1 to C10 aliphatic organic group, and n7 and n8 are the same or different and each are independently an integer ranging from 0 to 3;

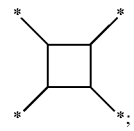

Chemical Formula 4-2

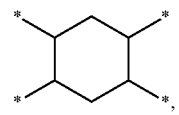

Chemical Formula 4-3

$R^2$ is the same or different in each structural unit, and each is independently represented by Chemical Formula 5, Chemical Formula 6, or Chemical Formula 7:

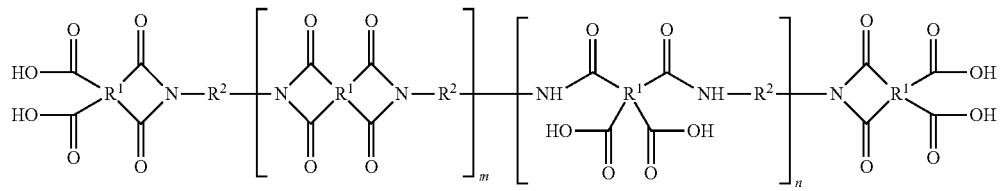

Chemical Formula 3 in Chemical Formula 3, $R^1$ is the same or different in each structural unit, and each is independently represented by any one of Chemical Formula 4-1 to Chemical Formula 4-3:

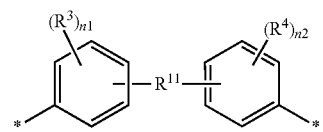

Chemical Formula 5 in Chemical Formula 5, $R^{11}$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group, $R^3$ and $R^4$ are the same or different and each are independently a halogen, a hydroxyl group, a substituted or unsubstituted C1 to C10 aliphatic organic group, a substituted or unsubstituted C6 to C20 aromatic organic group, an alkoxy group of formula $-OR^{200}$, wherein $R^{200}$ is a C1 to C10 aliphatic organic group, or a silyl group of formula wherein $-SiR^{201}R^{202}R^{203}$, and $R^{201}$, $R^{202}$, and $R^{203}$ are the same or different and each are independently a hydrogen, or a C1 to C10 aliphatic organic group, and n1 and n2 are the same or different and each are independently an integer ranging from 0 to 4;

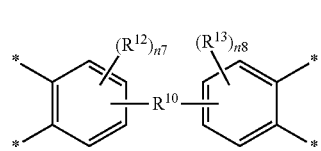

Chemical Formula 4-1 in Chemical Formula 4-1, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula $-OR^{205}$, wherein $R^{205}$ is a C1 to C10 aliphatic organic Chemical Formula 6

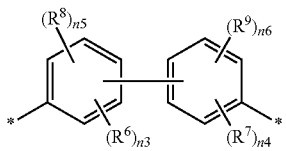

in Chemical Formula 6,
$R^6$ and $R^7$ are the same or different and each are independently an electron withdrawing group,
$R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{20}$, are the same or different, and each are independently a hydrogen, a C1 to C10 aliphatic organic group,
n3 is an integer ranging from 1 to 4,
n5 is an integer ranging from 0 to 3,
provided that n3+n5 is an integer ranging from 1 to 4,
n4 is an integer ranging from 1 to 4, and
n6 is an integer ranging from 0 to 3,
provided that n4+n6 is an integer ranging from 1 to 4;

Chemical Formula 7

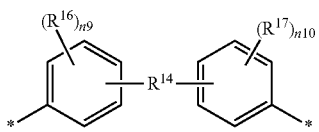

in Chemical Formula 7,
$R^{14}$ is O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more moieties linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH,
$R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{212}$, wherein $R^{212}$ is a C1 to C10 aliphatic organic group, or a silyl group of formula —$SiR^{213}R^{214}R^{215}$, wherein $R^{213}$, $R^{214}$, and $R^{21}$, are the same or different, and each are independently a hydrogen or a C1 to C10 aliphatic organic group, and
n9 and n10 are each independently an integer ranging from 0 to 4, and
wherein each m and n indicates the mole number of each structural unit, and is independently an integer of equal to or greater than 0, provided that m+n is equal to or greater than 1.

7. The composition of claim 6, wherein Chemical Formula 4-1 is represented by Chemical Formula 8 or Chemical Formula 9:

Chemical Formula 8

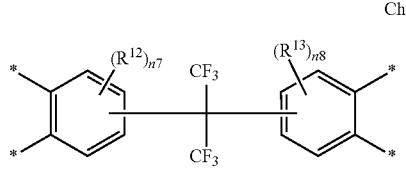

Chemical Formula 9

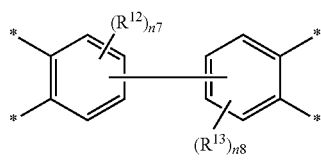

in Chemical Formulae 8 and 9,
$R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{205}$, wherein $R^{205}$ is a C1 to C10 aliphatic organic group, or a silyl group of formula —$SiR^{209}R^{210}R^{211}$, wherein $R^{209}$, $R^{210}$, and $R^{211}$ are the same or different and each are independently a hydrogen, or a C1 to C10 aliphatic organic group, and
n7 and n8 are the same or different and each are independently an integer ranging from 0 to 3.

8. The composition of claim 6, wherein $R^{11}$ of Chemical Formula 5 is selected from chemical formulae:

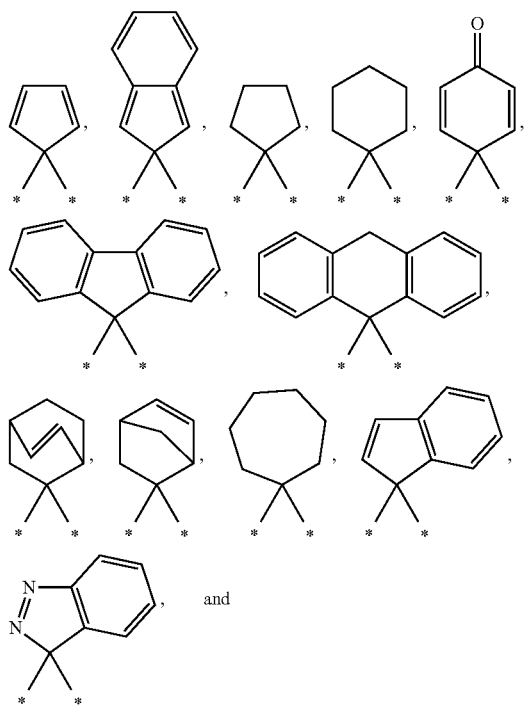

and

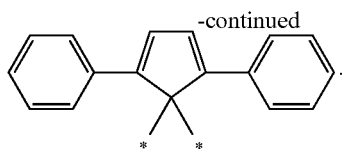

9. The composition of claim 6, wherein $R^6$ and $R^7$ of Chemical Formula 6 are the same or different, and are each independently selected from —$CF_3$, —$CCl_3$, —$CBr_3$, —$CI_3$, —$NO_2$, —CN, —$COCH_3$, and —$CO_2C_2H_5$.

10. The composition of claim 6, wherein $R^1$ of Chemical Formula 3 is the same or different, and is independently selected from Chemical Formula 4-1 or Chemical Formula 4-2, and wherein Chemical Formula 4-1 is represented by Chemical Formula 8 or Chemical Formula 9:

Chemical Formula 8

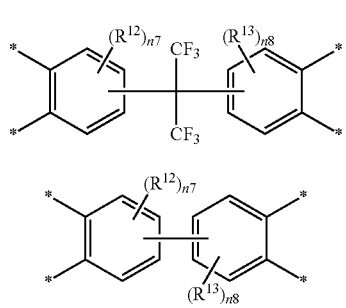

Chemical Formula 9 in Chemical Formulae 8 and 9, $R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{205}$, wherein $R^{205}$ is a C1 to C10 aliphatic organic group, or a silyl group of formula —$SiR^{209}R^{210}R^{211}$, wherein $R^{209}$, $R^{210}$, and $R^{211}$ are the same or different and each are independently a hydrogen, or a C1 to C10 aliphatic organic group, and both n7 and n8 are 0.

11. The composition of claim 6, wherein $R^2$ of Chemical Formula 3 is the same or different, and is independently selected from Chemical Formula 6, or Chemical Formula 7, wherein in Chemical Formula 6, n5 and n6 are 0, and $R^6$ and $R^7$ are —$CF_3$, and wherein in Chemical Formula 7, n9 and n10 are 0, and $R^{14}$ is —$SO_2$—.

12. The composition of claim 6, wherein $R^1$ of Chemical Formula 3 is the same or different, and is independently selected from Chemical Formula 4-1, and wherein Chemical Formula 4-1 is represented by Chemical Formula 8, or Chemical Formula 9, and wherein $R^2$ of Chemical Formula 3 is the same or different, and is independently selected from Chemical Formula 6, and wherein both n5 and n6 are 0, and both $R^6$ and $R^7$ are —$CF_3$:

Chemical Formula 8

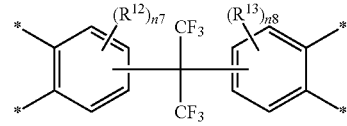

Chemical Formula 9

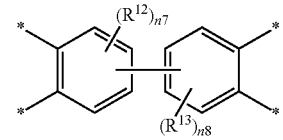

in Chemical Formulae 8 and 9, $R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{205}$, wherein $R^{205}$ is a C1 to C10 aliphatic organic group, or a silyl group of formula —$SiR^{209}R^{210}R^{211}$, wherein $R^{209}$, $R^{210}$, and $R^{211}$ are the same or different and each are independently a hydrogen, or a C1 to C10 aliphatic organic group, and both n7 and n8 are 0.

13. The composition of claim 1, wherein an amount of the inorganic particle is less than about 50 weight % based on the total weight of the composition.

14. The composition of claim 1, wherein an amount of the inorganic particle is from about 5 weight % to about 45 weight % based on the total weight of the composition.

15. A polymer prepared by curing the composition of claim 1.

16. The polymer of claim 15, wherein the polymer is crosslinked via a plurality of the inorganic particles comprising two or more amino groups on the surface of each particle.

17. An article comprising the polymer of claim 15.

18. A display device comprising the article of claim 17.

* * * * *